United States Patent [19]

Panzica et al.

[11] Patent Number: 5,057,128

[45] Date of Patent: Oct. 15, 1991

[54] ROTARY ADSORPTION ASSEMBLY

[75] Inventors: Nicholas J. Panzica, Farmington Hills, Mich.; Lennart Gustavsson, Växjö, Sweden; Leif Josefsson, Sterling Heights; Hans O. Lannefors, W. Bloomfield, both of Mich.

[73] Assignee: Flakt, Inc., Madison Heights, Mich.

[21] Appl. No.: 547,988

[22] Filed: Jul. 3, 1990

[51] Int. Cl.$^5$ .............................................. B01D 53/06
[52] U.S. Cl. ...................................... 55/181; 55/390; 55/400
[58] Field of Search ................... 55/179, 181, 390, 400

[56] References Cited

U.S. PATENT DOCUMENTS

| | | | |
|---|---|---|---|
| 2,639,000 | 5/1953 | Edwards | 55/179 |
| 3,176,446 | 4/1965 | Siggelin | 55/189 |
| 3,807,149 | 4/1974 | Norback | 55/388 |
| 3,844,737 | 10/1974 | Macriss et al. | 55/34 |
| 3,865,924 | 2/1975 | Gidaspow et al. | 423/230 |
| 3,925,021 | 12/1975 | Yoshino et al. | 23/252 R |
| 4,012,206 | 3/1977 | Macriss et al. | 55/34 |
| 4,046,525 | 9/1977 | Matsuo et al. | 55/59 |
| 4,134,743 | 1/1979 | Macriss et al. | 55/34 |
| 4,147,523 | 4/1979 | Izumo | 55/208 |
| 4,160,059 | 7/1979 | Samejima | 428/288 |
| 4,181,513 | 1/1980 | Fukuda et al. | 55/316 |
| 4,259,092 | 3/1981 | Matsuo et al. | 55/78 |
| 4,349,356 | 9/1982 | Wakao | 55/16 |
| 4,402,717 | 9/1983 | Izumo et al. | 55/388 |
| 4,469,494 | 9/1984 | van Weenen | 55/179 |
| 4,726,821 | 2/1988 | Sgaslik | 55/196 |
| 4,778,492 | 10/1988 | Dawson | 55/78 |
| 4,846,855 | 7/1989 | Tsujimoto | 55/60 |

FOREIGN PATENT DOCUMENTS 5328260 8/1978 Japan ............................. 55/390

*Primary Examiner*—Bernard Nozick
*Attorney, Agent, or Firm*—Harness, Dickey and Pierce

[57] ABSTRACT

An apparatus for adsorptive filtering of contaminants from a gaseous stream is provided. The apparatus includes a frame member. The frame includes a base member which is rotatable about an axis. A plurality of walls are attached to the base member and extend axially therefrom to a top member for providing a plurality of circumferential segment areas. The walls include a radially inner side for defining an axially extending inner chamber and a radially outer side for defining an outer periphery. A plurality of adsorption elements, each having an axial first side and an axial second side, are axially spaced in each of said circumferential segment areas. A duct or the like radially directs contaminated air into at least an entire one of the segment areas. The apparatus has a duct arrangement for directing a substantially radial flow of air into at least one of said segments from the outer periphery through the axial first side of each of said adsorption elements in generally an axial direction through the adsorption element to exit the axial second side and into said axially extending inner chamber for exhausting decontaminated air out through the axial chamber.

The present invention may also include a regenerative portion which can regenerate the adsorptive elements during operation of the apparatus. The regenerative portion includes ducts for supplying a heated regenerative air stream and a cooling air stream to strip contaminants from the adsorptive elements and then cool them to a suitable adsorptive temperature.

9 Claims, 2 Drawing Sheets

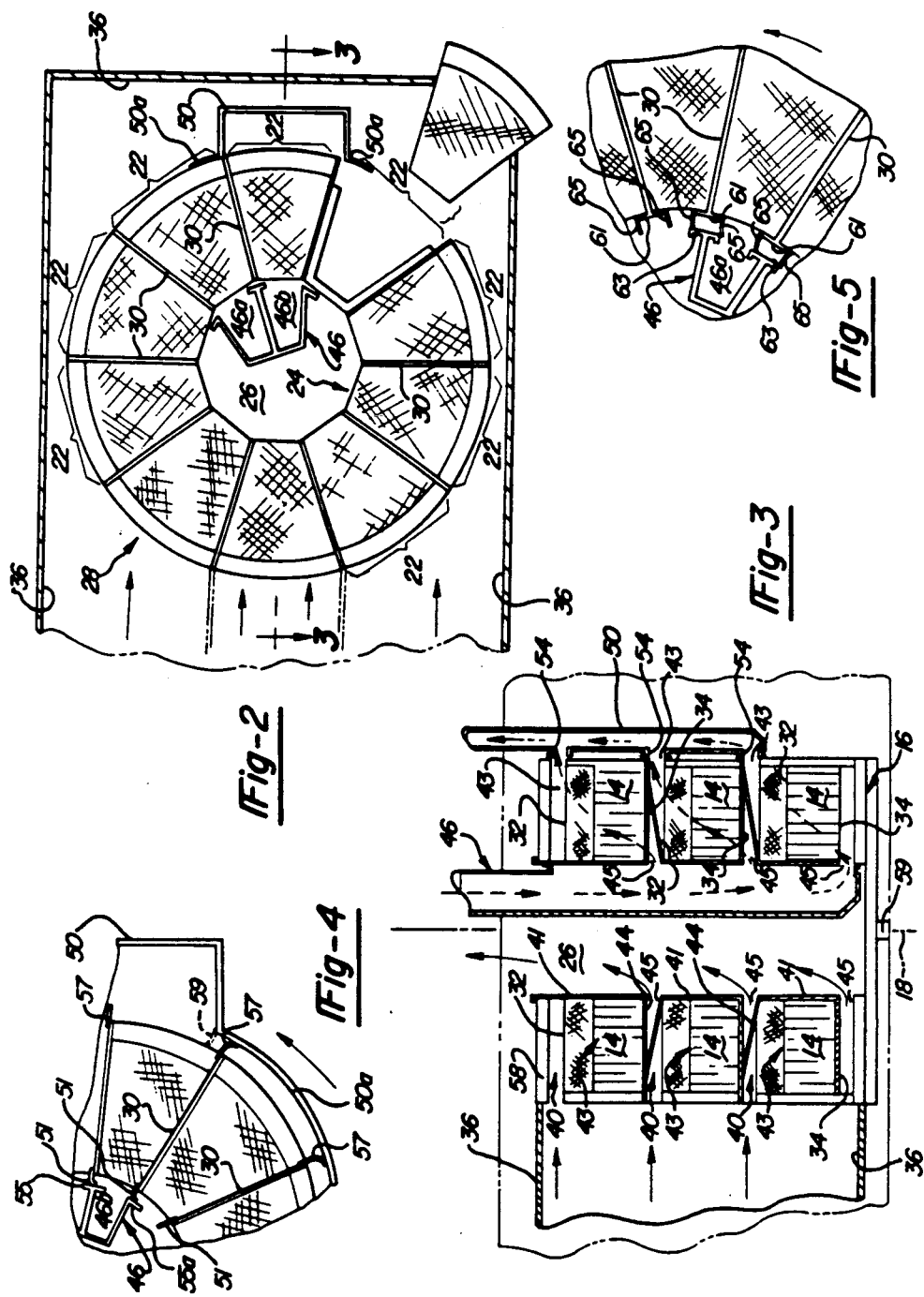

ROTARY ADSORPTION ASSEMBLY

BACKGROUND OF THE INVENTION

The present invention relates to a filtration apparatus for filtering gaseous contaminants out of an air stream. More specifically, the present invention relates to a rotary adsorption apparatus for filtering of volatile constituents from a gaseous stream.

In recent times, it has become necessary for many industries to provide methods of removing and/or reducing contaminates from a gaseous air stream. Thus, many air purification systems have been produced for removing or purifying of various gaseous contaminants.

A gaseous stream which is in need of purification is produced during operation of a manufacturing procedure or other job function. For instance, volatile constituents are commonly produced, in paint spray booths, during paint spraying operations. It is necessary to remove these volatile constituents prior to exhaustion of the air in the paint booth to the atmosphere. It is desirable to provide a purification system which can remain operational for extended periods of time, such that it does not substantially interfere with production operations. Such a purification apparatus would allow continued operation of the plant or the like without frequent and costly shutdown times for replacement or regenerating of the apparatus.

Adsorptive media, such as activated carbon and the like, has been used for some time to remove volatile constituents from a gaseous stream. These types of apparatuses have the advantage that the filtration element can be regenerated to produce added life to the apparatus. U.S. Pat. Nos. 4,778,422 to Dawson and 4,402,717 to Izumo et al. disclose such adsorptive filtering devices. U.S. Pat. No. 4,778,422 to Dawson shows an adsorption apparatus which is rotatably mounted such that the adsorption medium can be regenerated at the same time a gaseous stream is being purified. U.S. Pat. No. 4,402,717 to Izumo et al. discloses a similar apparatus that provides an axially directional flow of contaminated gas through a portion of an elongated cylindrical adsorption element, such that a portion of the adsorptive element may be regenerated during filtration of a gaseous stream.

While these patents have disclosed improvements in the art, there still remains the need to replace adsorptive elements when the adsorptive elements can no longer be regenerated. This requires replacement of an entire specifically designed adsorptive cartridge prior to continuing purification of the gaseous stream. Additionally, the volume occupied by these structures tends to be prohibitively large in light of the final volume flow of air treated.

In many of these prior structures it is necessary to provide a pre-filter sacrificial carbon bed which will take out high boiling point contaminants which may tend to load up the regeneratable bed, thus lessening its useful life. The necessity of such an external sacrificial bed adds greatly to the volume of the final assembly.

Thus, it is a goal in the art to provide replaceable adsorption elements, which can be readily and easily replaced when necessary. It has also been a goal in the art to reduce or eliminate the pre-filtering sacrificial bed to reduce space consumed by an adsorption apparatus. Additionally, it has been a goal in the art to provide an apparatus which will have improved airflow characteristics at lower total occupied volumes and be readily adaptable to existing duct work in paint spray booths and the like. It has also been a goal in the art to provide a more efficient method of removing volatile constituents from a gaseous stream without the disadvantages set forth above.

SUMMARY OF THE INVENTION

In accordance with the present invention, an apparatus for adsorptive removal of contaminants from a gaseous stream is provided. The apparatus includes a frame member. The frame member includes a base member which is rotatable about an axis. A plurality of walls are attached to the base member and extend axially therefrom to a top member for providing a plurality of circumferential segment areas. The walls include a radially inner side for defining an axially extending inner chamber and a radially outer side for defining an outer periphery.

A plurality of adsorption elements, each having an axial first side and an axial second side, are axially spaced in each of said circumferential segment areas.

A duct or the like radially directs contaminated air into at least an entire one of the segment areas.

The apparatus has a duct arrangement for directing a substantially radial flow of air into at least one of said segments from the outer periphery through the axial first side of each of said adsorption elements in generally an axial direction through the adsorption element to exit the axial second side and into said axially extending inner chamber for exhausting decontaminated air out through the axial chamber.

The present invention may also include a regenerative portion which can regenerate the adsorptive elements during operation and rotation of the apparatus.

Thus, in accordance with the present invention, an improved adsorption device is provided wherein adsorptive elements are readily replaceable as individually needed and which provides continual regeneration of the adsorptive elements until they can no longer be regenerated. Additionally, the present invention provides an efficient space saving device which is readily adaptable existing duct work for reducing volatile constituents from a gaseous stream.

Additional benefits and advantages of the present invention will be readily appreciated when taken in conjunction with the description of the preferred embodiment, the brief description of the drawings and the claims, as set forth below.

BRIEF DESCRIPTION OF THE DRAWINGS

FIG. 2 is a detailed sectional view of the apparatus of FIG. 1;

FIG. 3 is a sectional view taken along line 3—3 of FIG. 2;

FIG. 4 is a detailed view showing the sealing configuration at the regenerative duct portion; and FIG. 5 is a detailed view showing an alternate embodiment of a sealing configuration at the regenerative duct portion.

DESCRIPTION OF A PREFERRED EMBODIMENT

Figure 1:
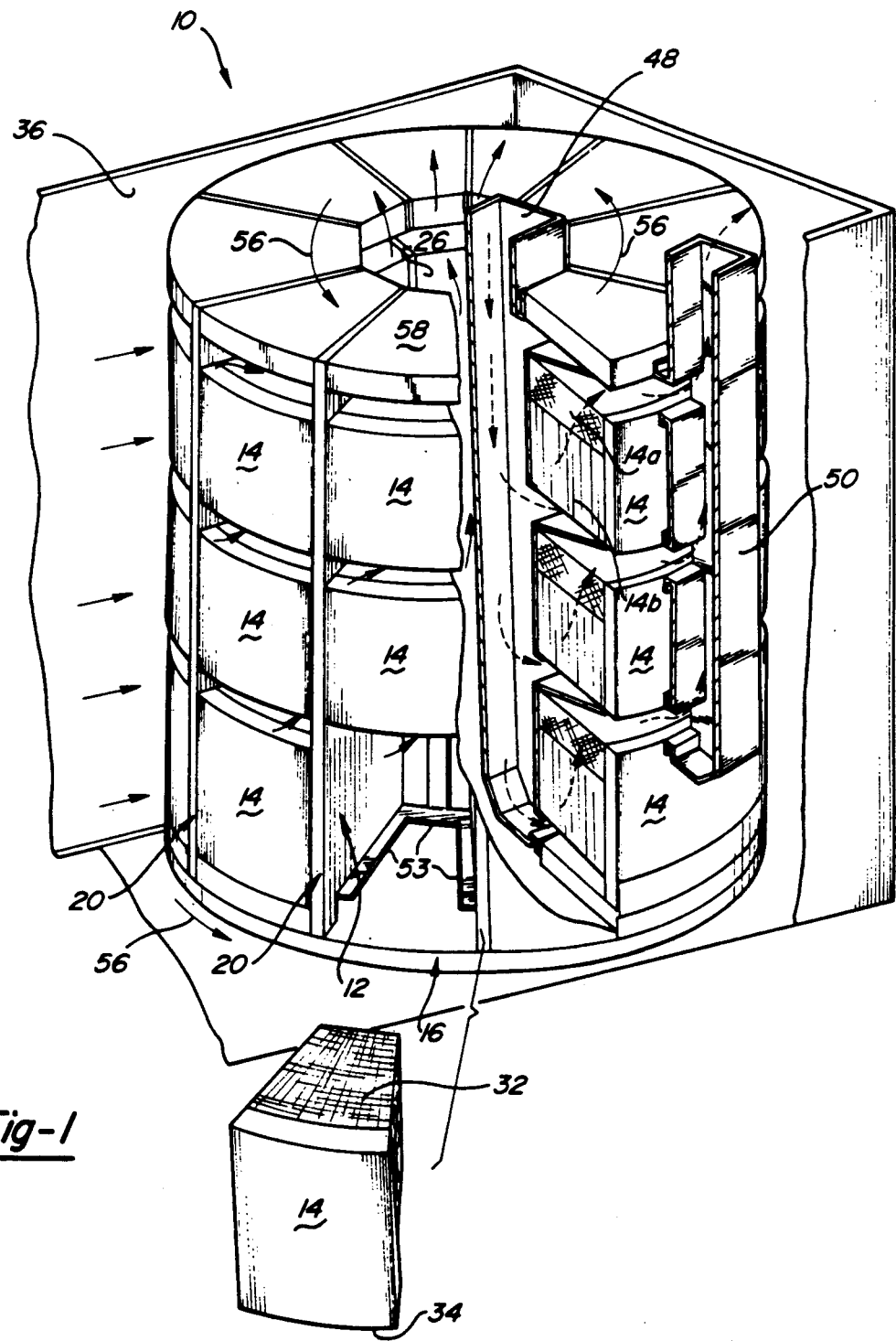
FIG. 1 is a perspective view partially broken away showing the rotary adsorption apparatus of the present invention in its operational environment.

In accordance with the present invention, there is provided an apparatus, generally shown at 10, for adsorptive filtering of contaminants of a gaseous stream. The apparatus includes a frame means, generally indicated at 12, for supporting a plurality of adsorption elements 14. The frame means includes a base member, generally indicated at 16, which is rotatable about an axis 18. A wall means, generally indicated at 20, is attached to the base member 16, and extends axially therefrom for providing a plurality of circumferential segment areas 22, as best seen in FIG. 2. The wall means 20 includes a radially inner side, generally indicated at 24, for defining an axially extending inner chamber 26. The wall means 20 also includes an outer peripheral side for defining an outer periphery, generally indicated by 28. Preferably, the wall means 20 includes a plurality of upstanding walls 30, which extend axially upwardly from the base member 16 and extend in a radial direction along the base member 16 to define the segment areas 22.

A plurality of the adsorption elements 14 are axially spaced in each of the segment areas 22. Each of the adsorption elements includes a first axial side 32 and a second axial side 34. The adsorption elements 14 are generally of a "pie slice" shape and are permeable only in generally an axial direction from the first axial side through an adsorption medium to the second axial side 34. The adsorption elements contain an adsorption medium, such as an activated carbon or the like, for adsorptively trapping volatile constituents.

In a preferred embodiment, the adsorptive elements 14 are removably secured in the segments 22 by the provision of transversely extending ledges 53 provided on the walls 30 and 41 at the location of each adsorptive element. Thus, each adsorptive element may be individually removed and replaced with a fresh element as required.

In a preferred embodiment, the adsorptive elements include a sacrificial upper portion 14a, which may be readily disposed of, and a lower carbon cassette 14b which can be replenished or replaced separately.

The sacrificial upper portion is provided directly in the main adsorptive unit. This provides for the elimination of a separate sacrificial bed unit required in the prior art which was provided upstream from the unit. Thus, the present invention reduces space previously required for housing the sacrificial bed. The beneficial removal of high boiling point (about 300° F.-400° F.) volatile constituents is substantially accomplished by the sacrificial portion 14a prior to the gaseous stream reaching the more expensive regeneratable carbon cassette 14b. Preferably, the portion 14a is filled with a disposable inexpensive granulated type activated carbon whereas the portion 14b is a honeycomb like material with an activated carbon attached on the walls of the honeycomb, as is known to those skilled in the art.

A means, such as an exhaust duct work 36 from a paint booth or other volatile containing source, radially directs contaminated air into at least one of the segment areas 22. The duct work may be provided by walls 36 for forming a chamber for directing air to a plurality of the segments.

Referring in particular to FIG. 3, a first duct means is provided, such as indicated generally at 40, for directing the substantially radial flow of volatile constituents containing air into at least one of the segment areas 22 from the outer peripheral side 28 through the axial first side 32 of the adsorption elements, and thereafter in an axial direction to exit the axial second side 34 of the adsorption element for exhaust through the axially extending inner chamber 26.

In a preferred embodiment, the duct means 40 includes horizontally slanted walls 42 and 44 which enclose the entire portion of the segment along its radial length, and an axially extending inner wall 41 for enclosing the radially inner portion of the segment. The walls 42 and 44 slope from the outer periphery downward to the inner periphery. The walls 42 and 44, the upper portion 58 and base 16 provide air input ports 43 and air output ports 45 between each of the spaced adsorptive elements 14, as best seen in FIG. 3.

A regenerative duct means, generally shown at 46, is provided in the axially extending inner chamber 26. The regenerative duct means 46 is communicative with at least an inner portion of one of the segment areas 22 for forcing of a regenerative gaseous stream through the second axial side 44 and out through the first axial side and then outward for storage for disposal, reuse or destruction of the volatile constituents. As shown in the drawings, in a preferred embodiment the regenerative duct means includes a first duct portion 46b for regeneration of one or more areas containing adsorptive elements at a time. A second duct portion 46a is provided for sending a cooling stream through the previously regenerated adsorptive elements for returning the elements to the proper temperature for continued adsorption.

Regenerative duct means 46 includes an input manifold 48 and an output manifold 50. As stated above, the walls 42 and 44 provide respective input ports 43 and output ports 45, which are situated between the adsorptive elements 14. The input manifold is sealingly coupled with the inner periphery of at least one of the segments 22, for allowing a regenerative gaseous stream to be passed through the ports 45 and through the adsorptive elements 14. The output manifold includes portions for forming ports 54 which sealingly engage the ports 43 such that the regenerative stream exiting the first axial side 32 exits through the manifold 50 by way of the output ports 54, which couple with the ports 43 for removing the regenerative gas stream therefrom.

Referring now to FIG. 4, lip seals 51 are attached to the walls 30 which cooperate with the flanges 55a and 55 for sealing between the chamber 46a and 46b and the walls 30 during regeneration of the adsorptive elements 14. Lip seals 57 are attached and extended radially outwardly from the walls 30 for sealing between flanges 50a and the individual walls 30 forming the segments. Alternatively, the sealing lips coupled be provided on the flanges 55, 55a or 50a such as shown for example by sealing lip 59 shown in phantom in FIG. 4.

Referring now to FIG. 5, there is shown an alternate embodiment of a sealing arrangement for the chambers 46a or 46b. In this embodiment the walls 30 include a circumferentially extending wall 61 for forming a first 'T' shaped flange. The chambers 46a or 46b include 'T' flanges 63. A pair of lip seals 65 are provided on the circumferential outer edge of the flanges 61 which seal against flanges 63. This configuration allows only one segment to be subjected to regenerative or cooling gases at a time during rotation of the assembly. Thus, because of this configuration the flanges 63 either engage the adjacent pairs of sealing lips 61 or a particular flange may engage one of each of contiguous pairs of sealing lips such that either a regenerative or cooling stream passes through only one of the segments or is stopped by the flange 61. Of course, the lip seals could be provided on the flanges 63 instead of the flange 61 to accomplish the same result.

In operation, referring now to FIGS. 1 and 3, the gas purification flow of the gaseous stream is illustrated in solid arrows and the regenerative gaseous flow is illustrated with dashed arrows. The gas purification flow includes the input of volatile contaminated air through the duct 36 or 38 which flows into the ports 43. Thereafter, because of the enclosure of the adsorptive element by side wall 30, inner walls 41 and the slanted walls 42 and 44, in conjunction with the top portion 58 and the base 16, an air flow path is created wherein the air may flow through the adsorption elements 14 in a segment 22 or plurality of segments 22 in a general axial direction and out through the ports 45. The air exits ports 45 into axial chamber 26 and thereafter to the atmosphere or back into the booth as a purified gas. During this process, the cylinder may be rotated, as shown by arrows 56, by way of a suitable motor 59, such that different adsorptive elements 14 are sequentially utilized. Alternatively, the frame could be rotated stepwise one segment at a time to provide the rotation movement. The rotation of the frame is preferably rotated at about 1 revolution per hour to 4 revolutions per hour, such that the volatiles adsorbed will not exceed the capacity of the adsorption media prior to regeneration. In a preferred embodiment the motor 59 is a 1760 RPM motor which is coupled to RPM reduction apparatus or drive means such that the shaft output from the reducer to the frame is in the above range. This prevents any overloading of the adsorptive elements which would allow volatile vapors to load up and desorb with the gaseous stream exiting from chamber 26.

During this rotation, the regeneration of the adsorptive elements may also be accomplished as follows. First, a regenerative gas, such as heated steam or the like, is introduced into the manifold portion 46b. The regenerative gas stream flows through the ports 45 causing the gaseous stream to flow axially upward through the adsorptive elements 14 from side 34 to side 32 and out the port 43 to the output manifold 50. Preferably, the regenerative gas is drawn through the manifold 46b and elements 14 under a negative pressure to reduce the possibility of contaminated air re-entering the chamber 26. The resulting stream is collected for removal and destruction of volatile constituents stripped from the adsorption medium contained in elements 14. Because, the adsorptive elements are heated during the regenerative process it is necessary to cool the elements back to a suitable temperature where adsorption can occur. In order to accomplish this, a fan (not shown) may be utilized to direct purified air from chamber 26 through the chamber 46a through the adsorptive elements 14 from channel 45 out through channel 43 and to exhaust into the chamber formed by walls 36. If desired, a cooling or refrigeration apparatus may be provided to cool the air stream prior to entering the adsorptive elements. Thereafter, the particular adsorptive elements 14 in a segment 22 may be circulated for further purification functions by the rotation of the frame 12.

Thus, with both the purification and regeneration operations taking place at once the apparatus of the present invention can be continually removing volatile constituents of gas while at the same time regenerating the adsorptive elements such that when a regenerative adsorptive element continues through the process it will again be used for removing volatile constituents as its rotation comes into the duct work 36. The rotation can continue until the adsorptive elements 14 become unusable whereafter they can be easily replaced by sliding them out and replacing them with new elements, as may be required.

Suitable doors or other access is provided on the duct work for providing access for replacement of the adsorptive elements. The configuration of the present invention provides improved air distribution and air velocity through the adsorption elements and between the individual elements. Additionally, the adsorption elements are readily replaceable when necessary and a net reduction in volume is realized in the present invention.

While the above description constitutes the preferred embodiment of the present invention it is to be appreciated that the invention is susceptible to modification, variation and change without departing from the proper scope and fair meaning of the accompanying claims.

What is claimed is:

1. An apparatus for adsorptive filtering of contaminants from a gaseous stream, said apparatus comprising:
    a frame means for supporting a plurality of adsorption elements, said frame means including a base member rotatable about an axis, a wall means attached to said base member and upstanding axially therefrom for providing a plurality of circumferential segment areas, said wall means including a radially inner side for defining an axially extending inner chamber and a radially outer side for defining an outer periphery;
    a plurality of adsorption elements axially spaced in each of said circumferential segment areas, each of said plurality of adsorption elements having an axial first side and an axial second side;
    a means for radially directing contaminated air into at least one of said segment areas; and
    a first duct means for directing said substantially radial flow of air between contiguous adsorption elements into at least one of said segment areas from said outer periphery through the axial first side of each of said adsorption elements to exit the axial second side and into said axially extending inner chamber for exhausting decontaminated air out through said axially extending inner chamber; wherein said base member is rotatable for sequentially interposing segment areas into the radially directed contaminated air for continual adsorptive purification of said gaseous stream.

2. The apparatus of claim 1 wherein each of said adsorptive elements is individually removable from said segment areas.

3. The apparatus of claim 1 wherein each of said adsorptive elements includes a sacrificial first portion adjacent the first axial side for removal of high boiling point volatile constituents from the gaseous stream and a regeneratable second portion adjacent the second axial side for removing volatile constituents from the gaseous stream.

4. The apparatus of claim 1 further comprising:
    a second duct means in said axially extending inner chamber communicative with at least an inner portion of one of said segments for causing a regenerative gaseous stream to progress through the second axial side of each of said adsorptive elements and out through the first axial side and outward in a radial direction; and a means for providing a regenerative gaseous stream to said duct means for regenerating at least one of said segments containing said adsorptive elements in a circumferential segment area during rotation of said frame means.

5. The apparatus of claim 4 wherein each of said adsorptive elements is individually removable from said segment areas.

6. The apparatus of claim 4 wherein each of said adsorptive elements includes a sacrificial first portion adjacent the first axial side for removal of high boiling point volatile constituents from the gaseous stream and a regeneratable second portion adjacent the second axial side for removing volatile constituents from the gaseous stream.

7. The apparatus of claim 4 wherein said second duct means further comprises a first duct portion for directing a first heated gaseous stream through each of said adsorptive elements in at least one of said segments and a second duct portion for directing a cooling gaseous stream through each of said adsorptive elements in at least one of said segments for cooling of said adsorptive elements to an effective adsorption temperature.

8. The apparatus of claim 7 wherein said first duct portion is communicative with a plurality of said segment areas for regenerating the adsorption elements in a plurality of the areas.

9. The apparatus of claim 7 further comprising a means for cooling of the cooling gaseous stream to a temperature below ambient temperature prior to passing the cooling gases through the adsorption elements 14.

* * * * *

UNITED STATES PATENT AND TRADEMARK OFFICE
CERTIFICATE OF CORRECTION

PATENT NO.  : 5,057,128
DATED       : October 15, 1991
INVENTOR(S) : Nicholas J. Panzica, et al.

It is certified that error appears in the above-identified patent and that said Letters Patent is hereby corrected as shown below:

Column 4, Line 45, Cancel "chamber" and insert --chambers--.

Column 4, Line 50, Cancel "coupled" and insert --could--.

Signed and Sealed this

Sixth Day of July, 1993

Attest:

MICHAEL K. KIRK

Attesting Officer

Acting Commissioner of Patents and Trademarks